Dec. 12, 1939. A. HENDERSON 2,183,018
APPARATUS FOR MAKING PERFORATED ANGLE BARS
Filed March 2, 1937 8 Sheets-Sheet 1
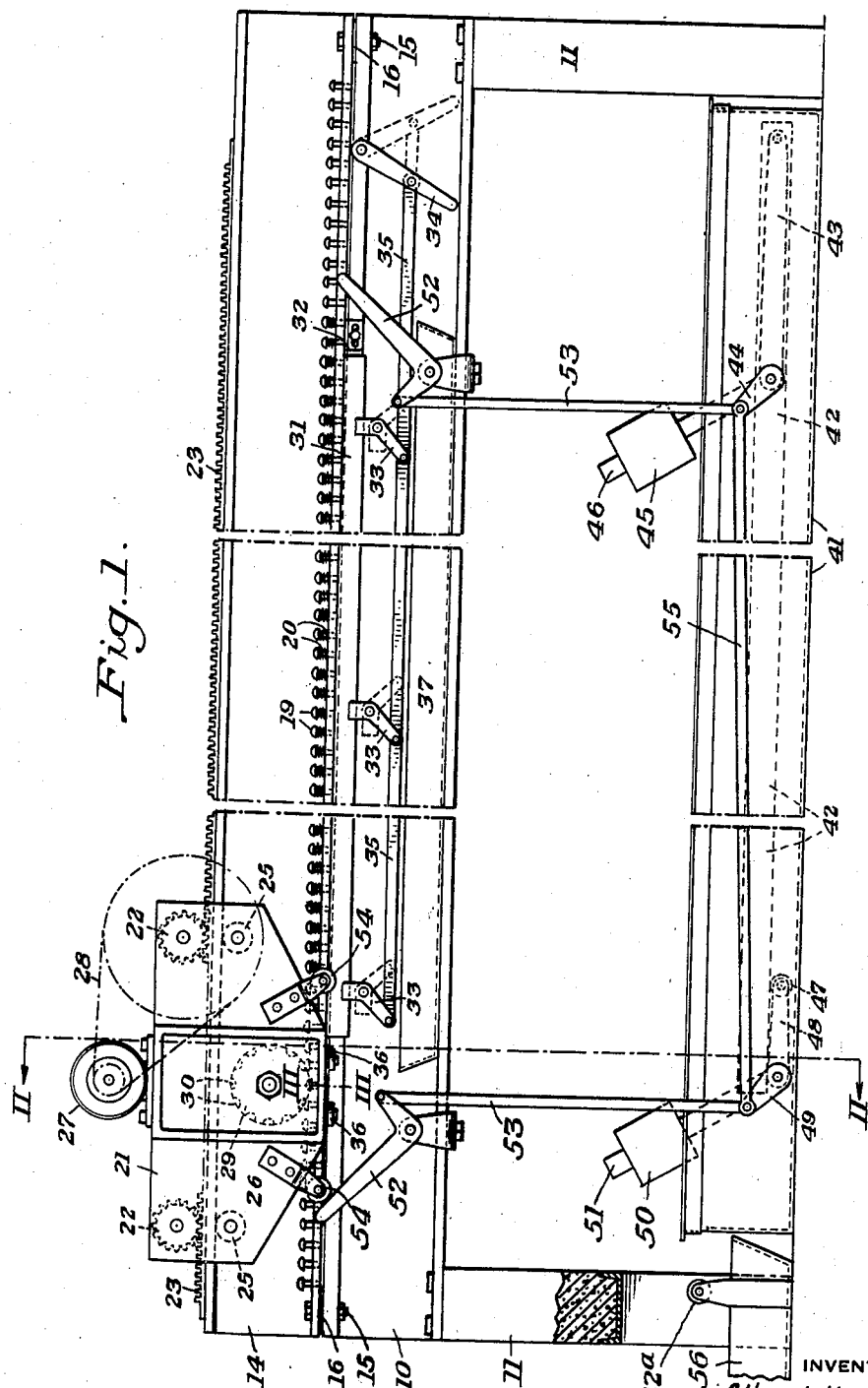

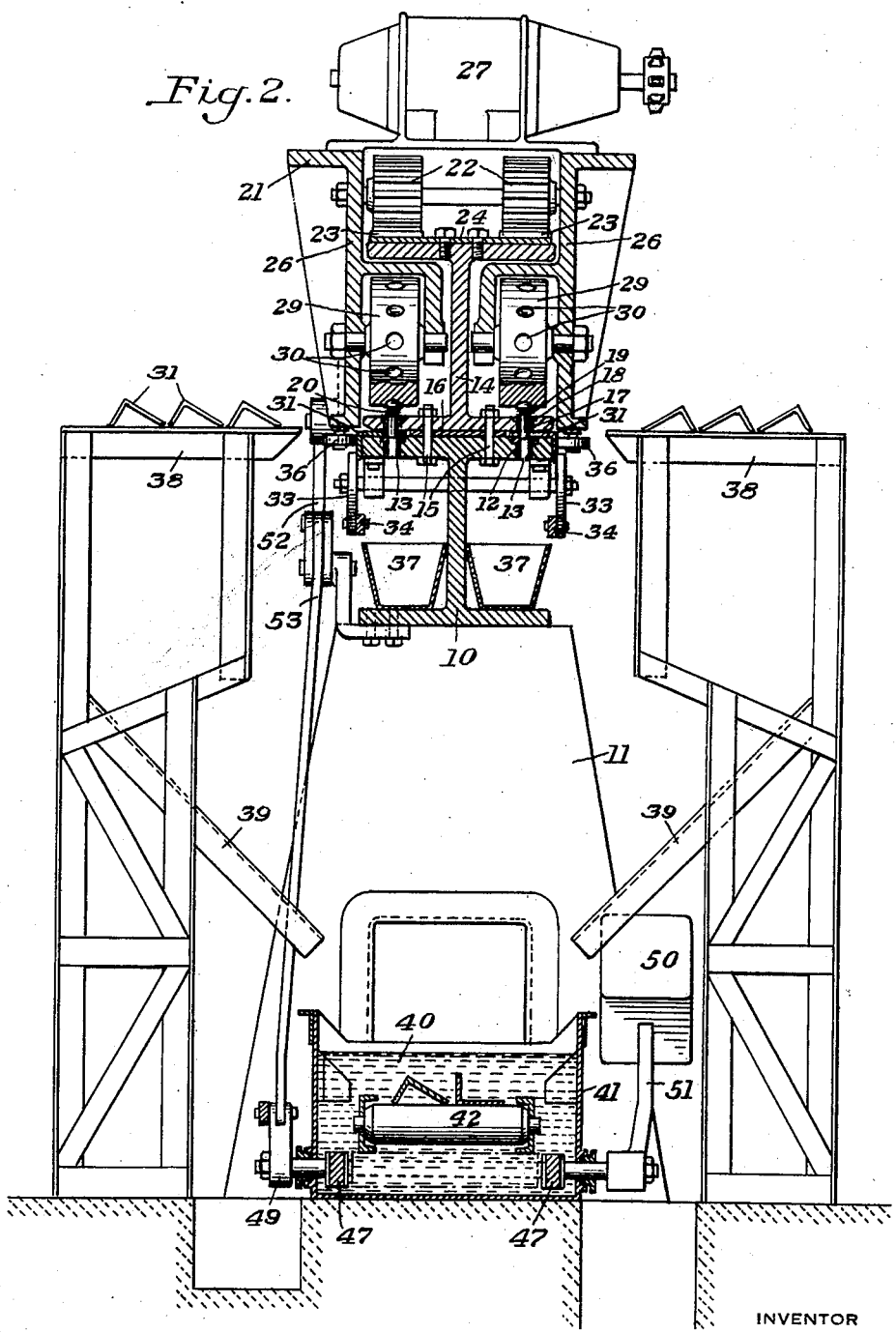

Dec. 12, 1939.   A. HENDERSON   2,183,018
APPARATUS FOR MAKING PERFORATED ANGLE BARS
Filed March 2, 1937    8 Sheets-Sheet 3
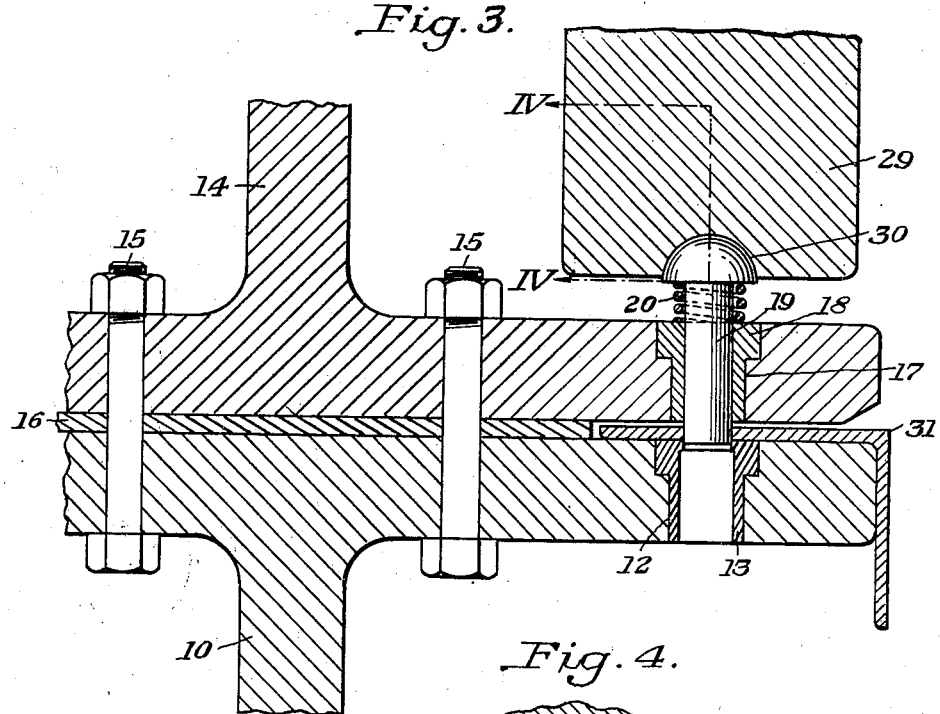
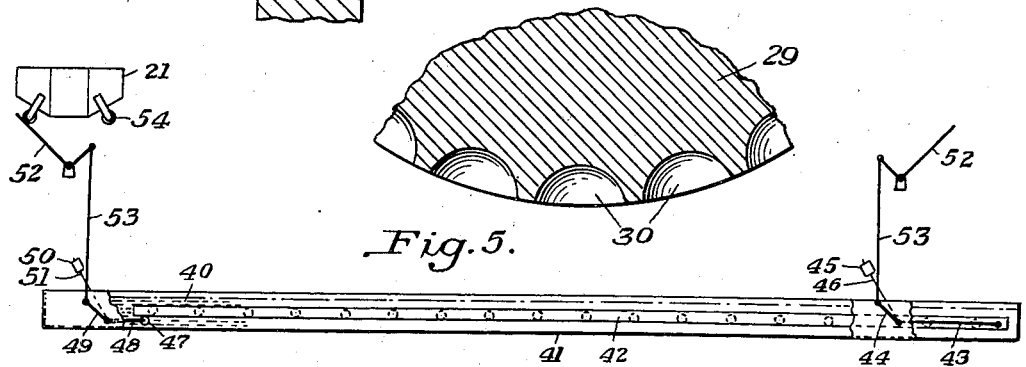
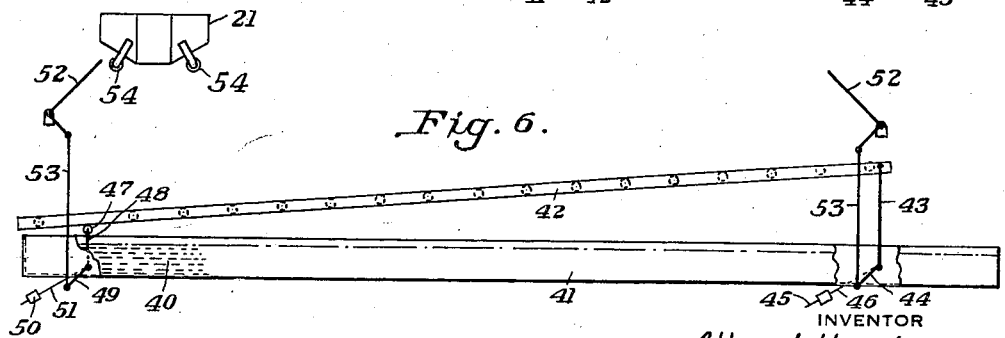
INVENTOR
Albert Henderson
by his attorneys
Stebbins, Blenko & Parmelee Dec. 12, 1939. A. HENDERSON 2,183,018
APPARATUS FOR MAKING PERFORATED ANGLE BARS
Filed March 2, 1937 8 Sheets-Sheet 4

INVENTOR
Albert Henderson
by his attorneys
Stebbins, Blenko & Parmelee

Dec. 12, 1939.   A. HENDERSON   2,183,018
APPARATUS FOR MAKING PERFORATED ANGLE BARS
Filed March 2, 1937   8 Sheets-Sheet 5

INVENTOR
Albert Henderson
by his attorneys
Stebbins, Blenko & Parmelee

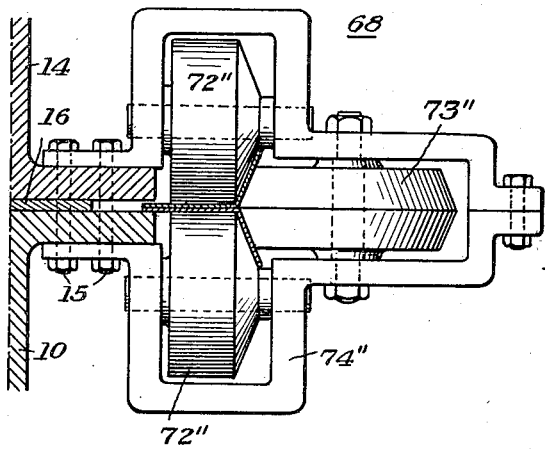
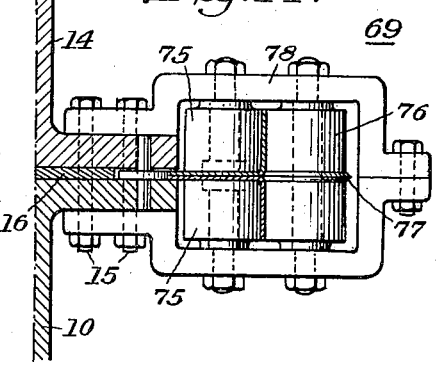
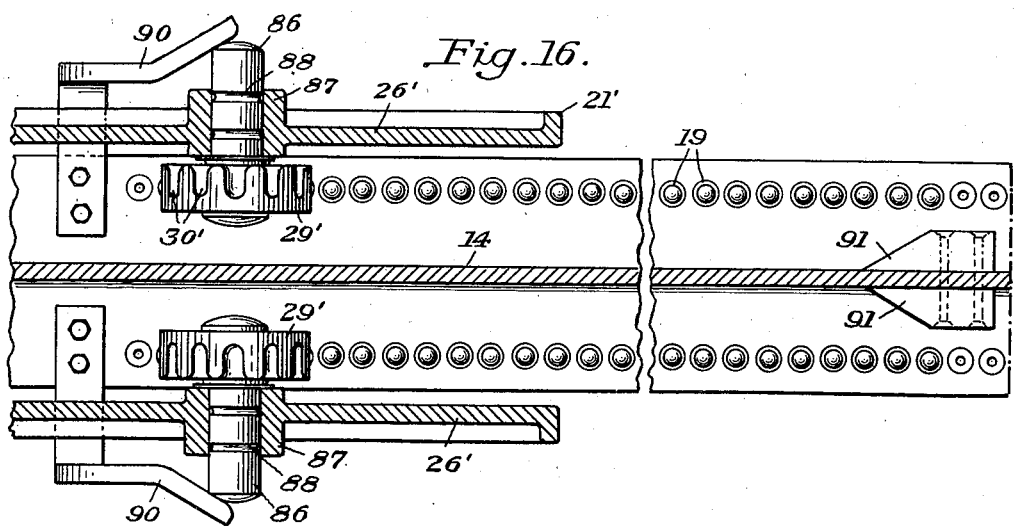
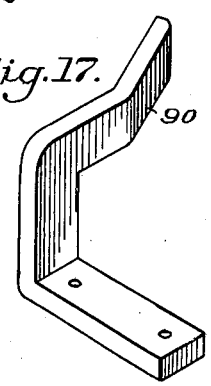

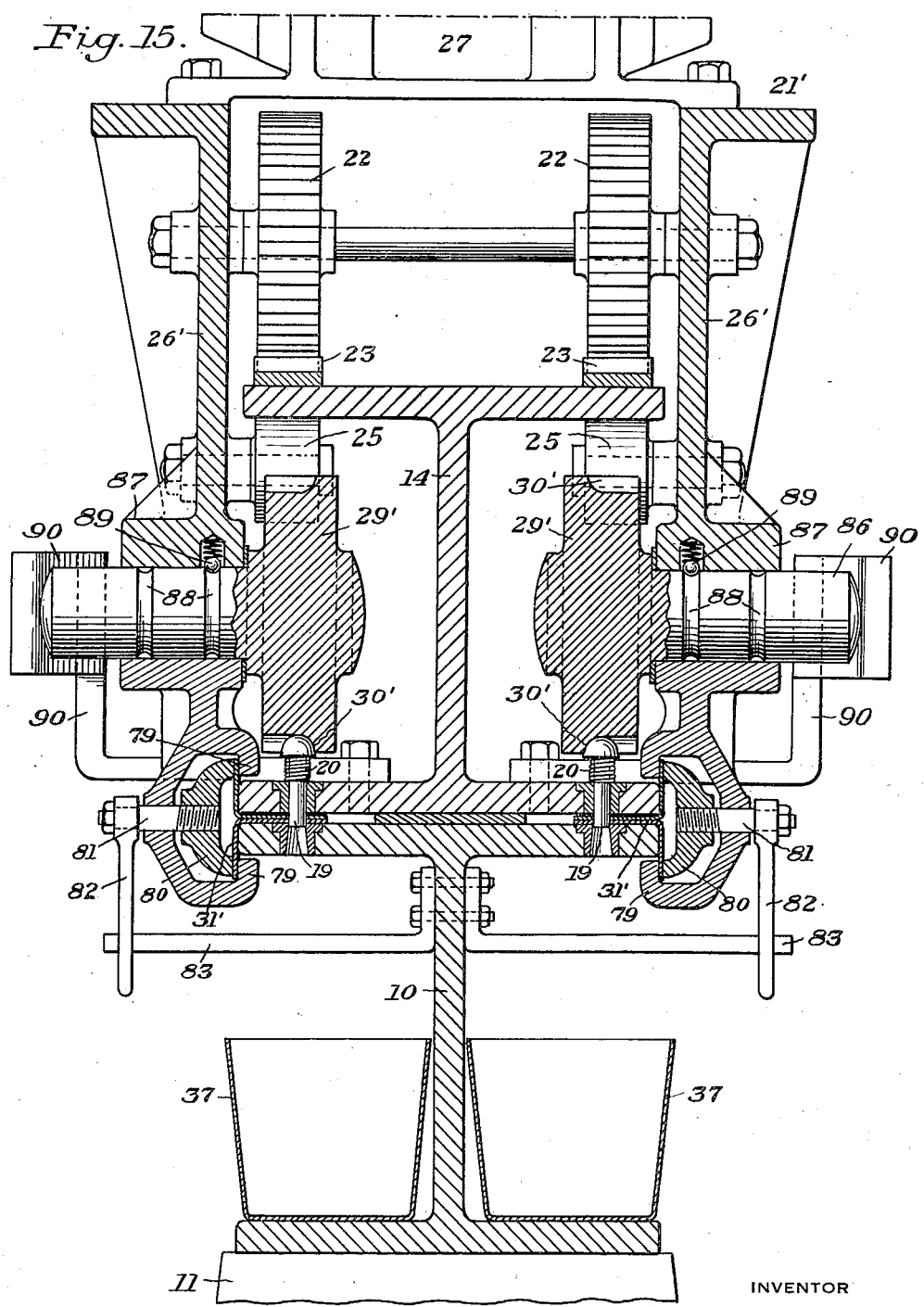

Dec. 12, 1939. A. HENDERSON 2,183,018
APPARATUS FOR MAKING PERFORATED ANGLE BARS
Filed March 2, 1937 8 Sheets-Sheet 8
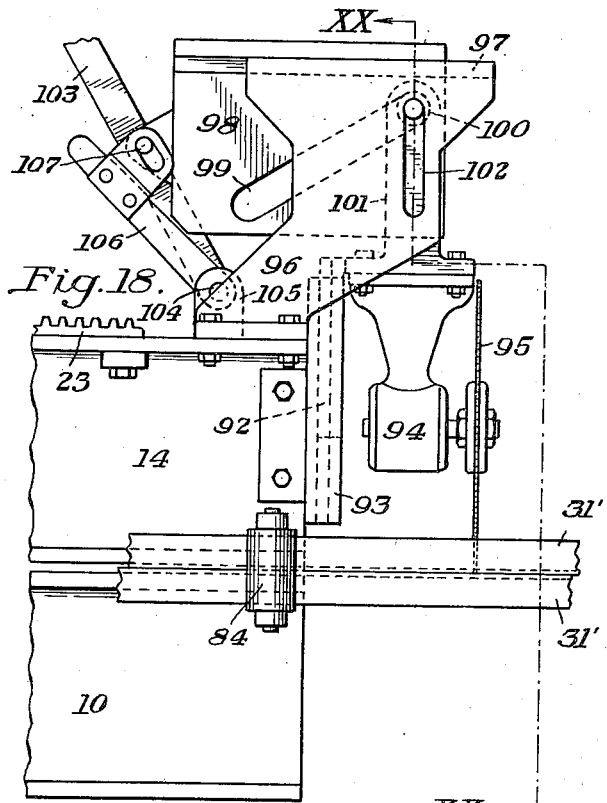
Fig. 18.
Fig. 19.
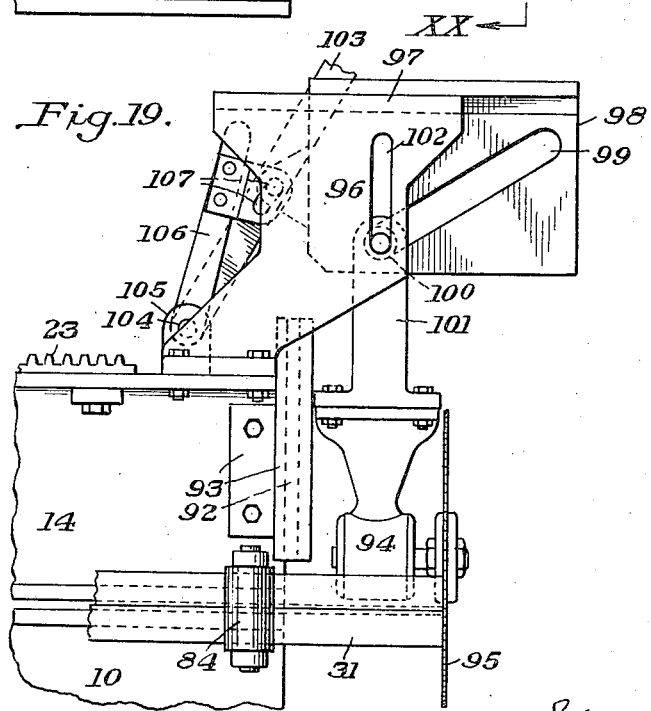
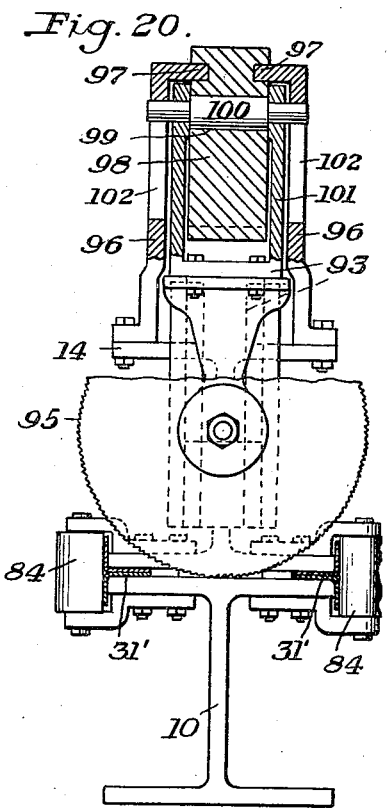
Fig. 20.
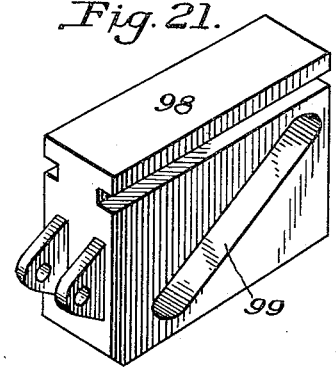
Fig. 21.
INVENTOR
Albert Henderson
by his attorneys
Stebbins, Blenko & Parmelee Patented Dec. 12, 1939

2,183,018

UNITED STATES PATENT OFFICE 2,183,018

APPARATUS FOR MAKING PERFORATED ANGLE BARS

Albert Henderson, Edgewood Borough, Pa., assignor to William P. Witherow, Pittsburgh, Pa.

Application March 2, 1937, Serial No. 128,627

5 Claims. (Cl. 153—2)

This invention relates to apparatus for making light structural members in the form of perforated angle bars such as are described and claimed in my copending applications Ser. Nos. 714,243 and 748,652 and in my Patent No. 2,042,463.

Gang punches have been known heretofore for punching a plurality of holes simultaneously. Such punches, however, are not suitable for perforating my structural members because the latter require extreme accuracy as to the spacing between adjacent holes. The sizes in which gang punches have been available heretofore necessitate several operations on a single member, in order to fully perforate it. Any slight error in the hole spacings would accumulate with successive punching operations and considerable inaccuracy might result.

I have invented a novel method and apparatus for forming light structural members composed of angles having one flange provided with perforations spaced therealong, which overcomes the objections aforementioned to the use of gang punches as known heretofore. In accordance with my invention, I provide an elongated work support adapted to receive an angle for punching. A plurality of individual punches are mounted above the work support for movement into engagement with a work-piece thereon. Means traveling along the length of the work-support successively actuates the several punches and effects progressive perforation of the angle.

My invention also contemplates the forming of angles progressively from flat strip, the punching of such angles, and severing them into the desired lengths. The invention also includes the application to the angles of a coating of protective material, such as paint or the like.

A preferred embodiment of the invention is illustrated in the accompanying drawings to be read in connection with the following detailed description. In the drawings, Fig. 1 is a side elevation, with a portion in section, of one form of the apparatus of my invention;

Fig. 2 is a transverse sectional view along the line II—II of Fig. 1, showing parts in elevation;

Fig. 3 is a fragmentary view showing a portion of the structure of Fig. 2 to enlarged scale;

Fig. 4 is a partial sectional view along the line IV—IV of Fig. 3;

Figs. 5 and 6 are diagrams illustrating the operation of the device shown in Figs. 1 and 2;

Figs. 12 through 14 are partial sectional views similar to Fig. 10, taken along the planes indicated by the correspondingly numbered lines of Fig. 7;

Fig. 15 is a transverse sectional view taken along the line XV—XV of Fig. 7;

Fig. 16 is a partial horizontal sectional view taken along the line XVI—XVI of Fig. 7;

Fig. 17 is a perspective view of a detail;

Fig. 18 is a partial side elevation of one end of the structure shown in Fig. 15 to enlarged scale;

Fig. 19 is a similar view showing the parts in an alternate position;

Fig. 20 is a view partly in end elevation and partly in section along the line XX—XX of Fig. 18; and Fig. 21 is a perspective view of a further detail.

Figure 7:
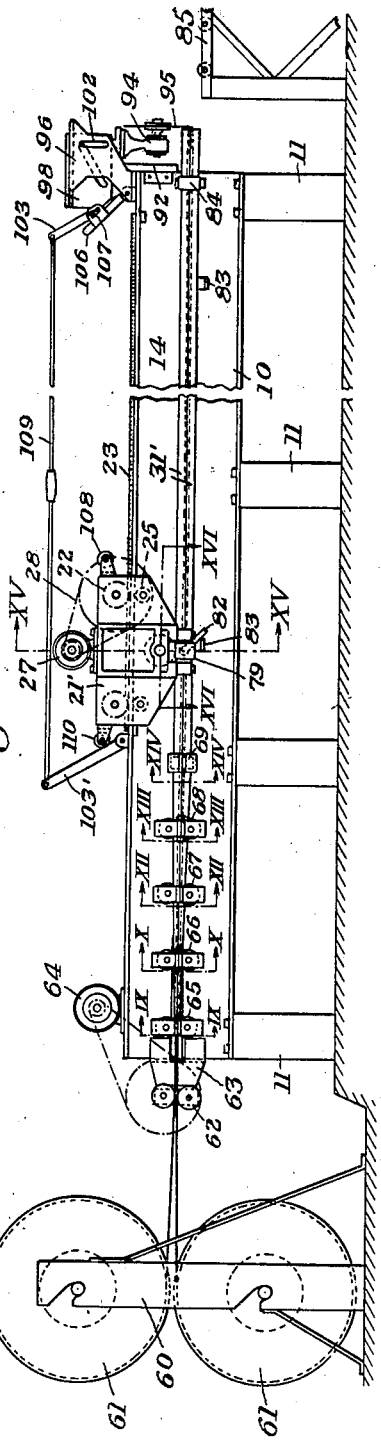
Fig. 7 is a side elevation of another form of the invention.

Referring to Figs. 1 through 6 for the present, my apparatus for perforating angles comprises a work-support 10 shown in the form of an H-beam supported on pillars 11. The upper flanges of the H-beam 10 are provided with holes 12 spaced therealong. Hardened inserts 13 are disposed in the holes 12 and have the upper edge of their bore sharpened to cooperate with a punch.

An H-beam 14 is superposed on the beam 10, being secured thereto by bolts 15 but spaced thereover by a spacer plate 16. The lower flanges of the H-beam 14 have holes 17 spaced therealong in alinement with the holes 12 in the upper flanges of the beam 10. Bearing bushings 18 are disposed in the holes 17 and a hardened punch 19 is reciprocably disposed in each bushing. The punches 19 are normally retracted by compression springs 20 but may be advanced, by means to be shortly described, to engage and penetrate material disposed between the lower flanges of the beam 14 and the upper flanges of the beam 10.

A carriage 21 travels back and forth along the beam 14. The carriage is supported on pinions 22 meshing with rack teeth 23 formed on a rack plate 24. The plate 24 is secured to the top flanges of the beam 14 in any convenient manner. Rollers 25 journaled on the side plates 26 of the carriage 21, in any convenient manner, engage the lower surfaces of the upper flanges of the beam 14 and resist the up-thrust to which the carriage is subject in operation, as will be later described. A motor 27 mounted on the carriage is adapted to drive one pair of pinions 22 through a chain and sprocket drive 28. The motor may be controlled manually or automatically to cause the desired reciprocation of the carriage 21 back and forth along the beams 10 and 14.

Rollers 29 are journaled in suitable bearings on opposite sides of the carriage 21 and are adapted to engage the upper ends or heads of the punches 19 to depress them successively as the carriage traverses its path. The rollers 29 have depressions 30 formed therein to receive the punch heads. Renewable bearing liners may be positioned in the depressions 30, if desired, instead of permitting the punch heads to engage the rollers directly. It will be apparent that traversing movement of the carriage 21 causes successive advancement of the several punches. The lower ends of the latter cooperate with the upper ends of the inserts 13 to punch holes in a workpiece, such as an angle 31, disposed in the slot between adjacent flanges of the beams 10 and 14.

The remaining details of the construction will be referred to in the following description of the operation of the apparatus shown in Figs. 1 to 4.

With the carriage 21 at either end of its back travel, angles 31 are disposed on the upper flanges of the beam 10, as shown in Fig. 2. Adjustable stops 32 may be employed to facilitate proper positioning of the angles lengthwise of the beam 10. Before placing the angles in position, holding dogs 33 pivoted to the beam 10 are moved to the positions shown in dotted lines in Fig. 1 by shifting a control lever 34. The latter is pivoted to a link 35 to which the dogs 33 are also pivoted. When the angles have been inserted, the dogs are returned to the positions in which they are shown in solid lines in Fig. 1 and serve to engage the depending flanges of the angles 31 to hold the latter against movement laterally of the workpiece.

With the angles 31 in the positions shown in Fig. 2, the carriage 21 is caused to traverse the length of the beam 14 under manual or automatic control. As already explained, this operation causes the punches 19 to be progressively advanced, to punch holes at spaced intervals along the length of the angles. Vertical rollers 36 carried at the lower edges of the carriage 21 progressively engage the depending flanges of the angles and tend to smooth out any bends therein. Trays 37 are positioned to receive the punchings removed from the flanges of the angles which rest on the work-support. When the carriage has completed its traversing movement, it is stopped to permit removal of the punched angles and their replacement by additional lengths of similar material. It will be understood that the punches 19, after being depressed by the rollers 29, are restored to their upper positions by the springs 20 as the carriage moves along.

Tables 38 (Fig. 2) disposed alongside the apparatus facilitate the introduction of angles thereto by providing a support for the angles paralleling and adjacent the work-support itself. The tables 38 are provided with skids 39. These skids are effective to deliver angles laid thereon after punching to a coating bath 40 contained in a tank 41 disposed below the beam 10. A roller conveyor 42 is movable into and out of the tank 41 and is adapted, when lowered into the tank, to receive lengths of punched angles for coating. I provide means for automatically raising the conveyor 42 and tilting it so that angles thereon will be discharged to a point of delivery.

The right-hand end of the conveyor 42, as viewed in Fig. 1, is pivoted to links 43. A crank arm 44 is rigid with one of the links 43, while a counterweight 45 is mounted on an arm 46 rigid with the other link. The left-hand end of the conveyor 42 rests on a roller 47 journaled on links 48 pivotally supported in bearings in the sides of the tank 41. A crank arm 49 is rigid with one of the cranks 48 while a counterweight 50 is carried on an arm 51 rigid with the other. As best shown in Fig. 6, the effect of the counterweights is to cause the conveyor 42 to move to the raised or tilted position there shown. In this position, of course, an angle on the conveyor will be discharged by gravity.

Bell cranks 52 are pivoted on one of the lower flanges of the beam 10 adjacent the ends of the path of travel of the carriage 21. The short arms of the cranks 52 are connected by links 53 to the crank arms 44 and 49, respectively. The long arms of the cranks 52 are adapted to be engaged by rollers 54 mounted on the carriage 21. As clearly shown in Fig. 5, the effect of the bell cranks, when moved to the positions shown in Fig. 1, is to lower the conveyor 42 to the position there shown. A link 55 connects the cranks 44 and 49 to insure simultaneous movement thereof.

I thus provide a discharge conveyor (the conveyor 42) which is disposed below the level of the coating fluid in the tank 41 when the carriage 21 is at the end of its movement. Angles removed from the work-support at this time and deposited on the skids 39 fall down into the tank and onto the conveyor. As soon as the carriage 21 moves from either end position, the counterweights will raise and tilt the conveyor to cause it to discharge the angles thereon after they have been coated by immersion.

It will be understood that the punched angles 31 are removed from the device after each traversing movement of the carriage 21, and that additional angles are disposed thereon for punching by the reverse travel of the carriage. The apparatus thus serves to punch two angles on each movement of the carriage in either direction, minimizing loss of time and increasing the hourly output.

Angles discharged from the conveyor 42 fall onto a roller conveyor 42a above a drain trough 56 where excess coating fluid runs off and is collected.

Another form of my invention illustrated in Figs. 7 through 21 is adapted not only to punch angles progressively, but also to form such angles from flat stock. In describing this form of the invention, the same reference numerals used in the description of the form shown in Figs. 1 through 4 will be used, so far as the parts are identical or similar.

Referring particularly for the present to Figs. 7 and 15, it will be seen that this form of the invention comprises a work-support in the form of a beam 10 having a punch holder and guide 14 disposed thereabove. A carriage 21' traverses the beam 14 to effect progressive punching of angles 31' in the manner already explained.

At the left-hand end of the device, as viewed in Fig. 7, I provide coil supports 60 adapted to support a plurality of coils 61 of flat strip for unwinding. Pinch rolls 62 are journaled in bearing brackets 63 projecting from the ends of the beams 10 and 14, and are driven by a motor 64 mounted on the latter. The pinch rolls 62 are effective to pull strip from each of the coils 61 simultaneously.

A plurality of stands of forming rolls 65, 66, 67 68 and 69 are mounted on the beams 10 and 14, as best shown in Figs. 9 through 14. The stand 65 comprises a pair of horizontal rolls 65' journaled in suitable bearing brackets 70, on each side of the beams, the flanges of the beams being notched or cut out adjacent the stand. The rolls 65' serve principally as guide rolls and cooperating with them are vertical rolls 71.

Figure 10:
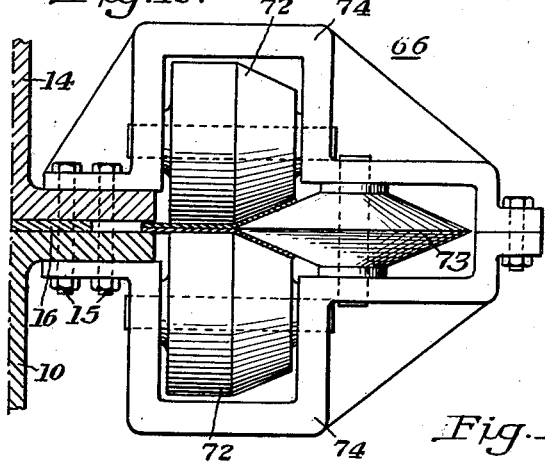
Fig. 10 is a partial sectional view taken along the line X—X of Fig. 7.
Figure 11:
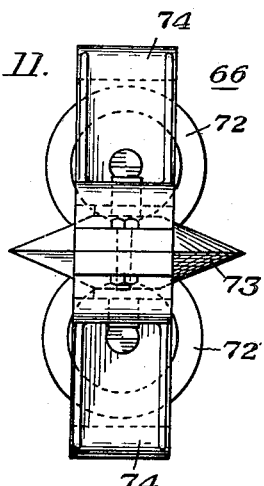
Fig. 11 is an end view of the parts of the apparatus shown in Fig. 10.
Figure 12:
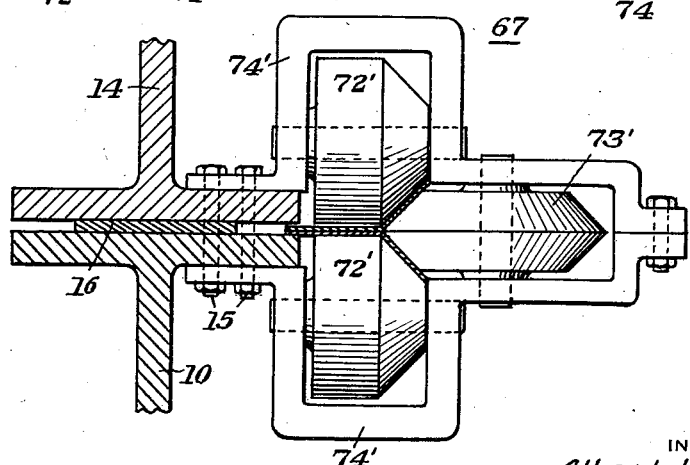

The stand 66 shown in Figs. 10 and 11 is the first shaping stand and comprises tapered horizontal rolls 72 and a beveled vertical roll 73 journaled in bearing brackets 74. As will be obvious from Fig. 10, the rolls 72 and 73 cooperate to bend the outer edges of the strip passing therethrough to a slight angle with the remainder thereof.

The progressive bending of the outer edges of the advancing strip is carried further in the stand 67 which is similar in all respects to the stand 66 except for the shape of the roll pass. For this reason, the parts of the stand 67 are designated by the same numerals as those of the stands 66 with a prime affixed thereto.

The stand 68 shown in Fig. 13 is also similar to the stand 66 except for the shape of the roll faces and the parts thereof are designated by the numerals used in referring to the parts of stands 66 with a double prime affixed.

Stand 69 shown in Fig. 14 comprises upper and lower vertical rolls 75 and a cooperating vertical roll 76 having a central bead or fin 77. The rolls of the stand 69 are journaled in bearing brackets 78 secured to the flanges of the beams 10 and 14.

It will be apparent that the action of the several stands of shaping rolls on the advancing strip is to progressively bend up the outer edge of the latter to form angles. After the strip has passed through the stand 69, the formation of the angles is complete, and it is only necessary thereafter to punch the spaced holes in one flange thereof and sever them to the proper lengths.

The structure and operation of the carriage 21' is substantially the same as that of the carriage 21 and only those portions of the former without counterparts in the latter will be specifically described.

The sides 26' on the carriage 21' are provided with relatively fixed jaws 79 adapted to engage the inner faces of the vertical flanges of the angles 31', as shown in Fig. 15. Movable jaws 80 cooperating with the jaws 79 are carried on screw shafts 81 journaled in the lower ends of the sides 26' of the carriage 21'. Levers 82 are mounted on the shafts 81 to turn the latter when the levers engage stops 83 adjacent the ends of the path of movement of the carriage 21'. It will be understood that the jaws 79 and 80 are elongated so that the jaws 80 are held against rotation on turning of the shafts 81. The screw shafts are so arranged that when the carriage 21' reaches the left-hand limit of its travel, as viewed in Fig. 7, the jaws will be operated to grip the angles 31' tightly. On subsequent movement of the carriage 21' toward the right, the gripping engagement of the jaws with the angles will cause additional strip to be drawn from the coils 61 through the pinch rolls and shaping rolls to produce four angle lengths simultaneously. At the same time, movement of the carriage pushes off of the work-support 10 the angle lengths previously formed after they have been punched and severed in a manner shortly to be described. Guide rolls 84 direct the angle lengths emerging from the work-support onto a delivery table 85.

Since the movement of the carriage is employed to advance the material through the shaping rolls, it is impossible to punch holes in the angles on both right and left-hand traversing movements of the carriage. To prevent operation of the punches 19 during the right-hand movement of the carriage which pulls additional strip from the coils through the shaping rolls, I mount the punch-depressing rollers 29' for movement into and out of operative relation with the punches. The rollers 29' have integral shafts 86 slidably journaled in bearing 87 formed on the sides 26' of the carriage 21'. The shafts 86 have peripheral grooves 88 therein and spring-pressed balls 89 cooperate therewith to hold the shafts and rollers 29 in one of two extreme positions.

Cam brackets 90 bolted to the beam 14 are adapted to force the shafts 86 inwardly when the carriage 21' reaches the left-hand limit of its movement. This operation will be clear from Fig. 16. When the carriage 21' moves from left to right, therefore, the rollers 29' do not engage the heads of the punches 19. The depressions 30 30' formed in the peripheral faces of the rollers 29' extend axially to the outer edge of the rollers whereby the inward movement of the latter just described can be effected. When the carriage 21' reaches the right-hand limit of its movement, camming blocks 91 (Fig. 16) engage the inner ends of the shafts 86 and restore the rollers 29' to the position in which they are illustrated in Fig. 15. It will thus be apparent that, after advancing the formed angle lengths, the return movement of the carriage effects the progressive punching of the angle flanges. It is unnecessary to state that stops 83 adjacent the right-hand limit of the travel of the carriage cause the jaws 80 to release their gripping engagement with the flanges of the angles so that the carriage 21' is free to make the reverse traversing movement. As before stated, during this movement the rollers 29' are shifted into the position shown in Fig. 16 so that they engage the heads of the punches 19 and progressively depress them to cause punching of the angles.

Figure 8:
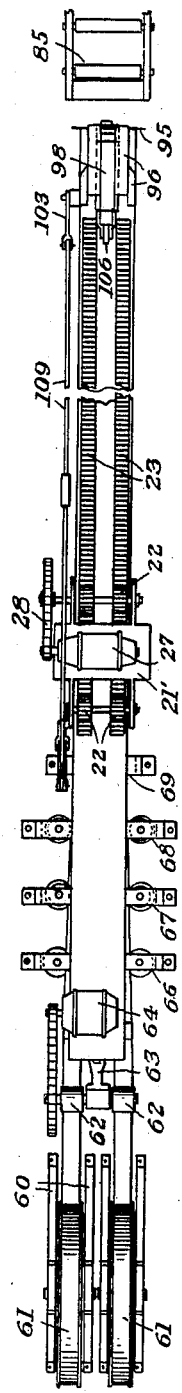
Fig. 8 is a plan view thereof.
Figure 9:
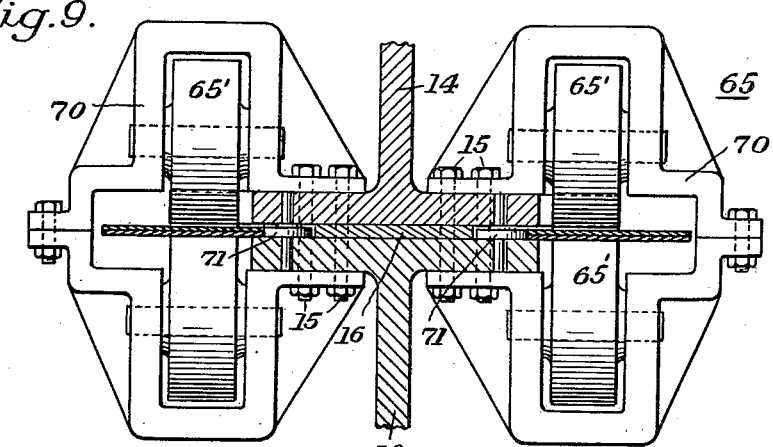
Fig. 9 is a sectional view taken along the line IX—IX of Fig. 7.

The means for severing the angles from the strip lengths after progressive bending and punching are shown at the right-hand end of Figs. 7 and 8 and in Figs. 18 through 20. A slide 92 is movable between vertical guides 93 secured at the end of the beam 14. A motor 94 is bolted to the slide and has a saw 95 mounted directly on the shaft thereof. Side plates 96 extend upwardly from the beam 14 and have horizontal guides 97 formed at the upper edges thereof. A slide block 98 is movable along the guides 97. The block 98 has a slot 99 therein disposed at an angle to the horizontal. A roller 100 is positioned in the slot 99. The reduced ends of the roller pass through holes in the side walls of a U-shaped bracket 101 extending upwardly from the slide 92 and the motor 94. The ends of the roller 100 also extend through vertical slots 102 in the side plates 96.

It will be apparent that movement of the block 98 toward the right, as viewed in Fig. 18, will cause the slide 92 and the motor 94 to be lowered as shown in Fig. 19. It will also be clear from Fig. 20 that the lowering of the slide 92 will bring the saw 95 into engagement with the angles 31'. By energizing the motor 94 to drive the saw, prompt severance of the angles may be obtained. It will be understood that when the carriage 21' moves from left to right, the punched angles lying on the work-support are fed therealong onto the receiving table 85 which supports them during the severing operation. Thereafter, the severed lengths may be moved on for further processing, such as painting or the like.

The severing means is automatically actuated by the movement of the carriage 21' to its right-hand limit. A lever 103 is secured to a shaft 104. The shaft is journaled in bearings 105 carried on the beam 14. A crank arm 106 is also keyed to the shaft 104 and has a pin and slot connection 107 to the slide block 98. A roller 108 mounted on the carriage 21 is so positioned as to engage the lever 103. Thus, as the carriage reaches the right-hand limit of its travel, the lever 103 and the crank arm 106 are swung clockwise and the saw is lowered into engagement with the angles.

A lever 103' similar to the lever 103 is journaled adjacent the left-hand limit of the carriage travel, and is connected to the lever 103 by a link 109. Roller 110 mounted on the carriage 21 is adapted to engage the lever 103' which restores the slide 92 and saw 95 to their uppermost position.

Although I have not deemed it necessary to make any specific disclosure thereof, the invention is well adapted for automatic control. The movement of the carriage 21' along its path may be employed through suitable limit and accelerating switches to control the motor 27. The latter, for example, may be started slowly, accelerated to its maximum speed, and then decelerated adjacent the end of its path. It may also be operated at a creeping speed, after the roller 108 engages the lever 103, to advance the saw 95 at the proper rate. The motor 64, of course, is controlled in accordance with the movement of the carriage 21' and is energized only when the carriage moves toward the right.

It will be clear from the foregoing description that the invention provides a simple yet efficient method and apparatus for punching preformed angles or for forming angles continuously from flat stock, then punching them and cutting to length. While I have described the invention as applied particularly to the making of punched angles, other shapes may be formed and punched, if desired. The apparatus is capable of rapid operation and may be made almost entirely automatic, the only attention necessary being in the nature of general supervision. The device may also be manually controlled, if desired. While I have not illustrated any means of supplying current to the motor 27, it will be understood that any convenient arrangement of trolleys, conductor rails, etc., may be employed in the known manner.

The invention also makes possible the punching of long lengths of material with a plurality of uniformly spaced holes without sacrifice of accuracy as to hole spacing, either between adjacent holes or between the holes and the edges of the angle flanges in which they are punched.

While I have illustrated and described but a preferred embodiment of the invention, many changes in the precise construction and operation disclosed may be made without departing from the spirit of the invention or the scope of the appended claims.

I claim:

1. The combination with an elongated work-support, a carriage movable therealong and punching means spaced therealong adapted to be actuated by movement of said carriage thereover, of a plurality of forming rolls in alinement with said support, and gripping means on the carriage effective for seizing material extending between said rolls and, on movement of the carriage, pulling it therethrough to shape it and thence along said support into position for punching.

2. The combination as defined by claim 1 characterized by means effective when the carriage reaches the limits of its travel, for tightening and loosening said gripping means, respectively.

3. The combination with an elongated work-support, and punches spaced therealong movable into engagement with a work-piece on said support, of a carriage movable along said support, and means on said carriage for causing punching movement of said punches, said means being movable into and out of operative relation to said punches.

4. The combination as defined by claim 3 characterized by means for moving said means into and out of operative relation with said punches adjacent the limits of the movement of said carriage.

5. Forming apparatus comprising a plurality of stands of forming rolls, a carriage traveling over an elongated work support for drawing a strip from a coil through said rolls, strip severing means movable to and from the path of the strip, and means actuated by said carriage for moving said severing means.

ALBERT HENDERSON.